Patented Jan. 3, 1939

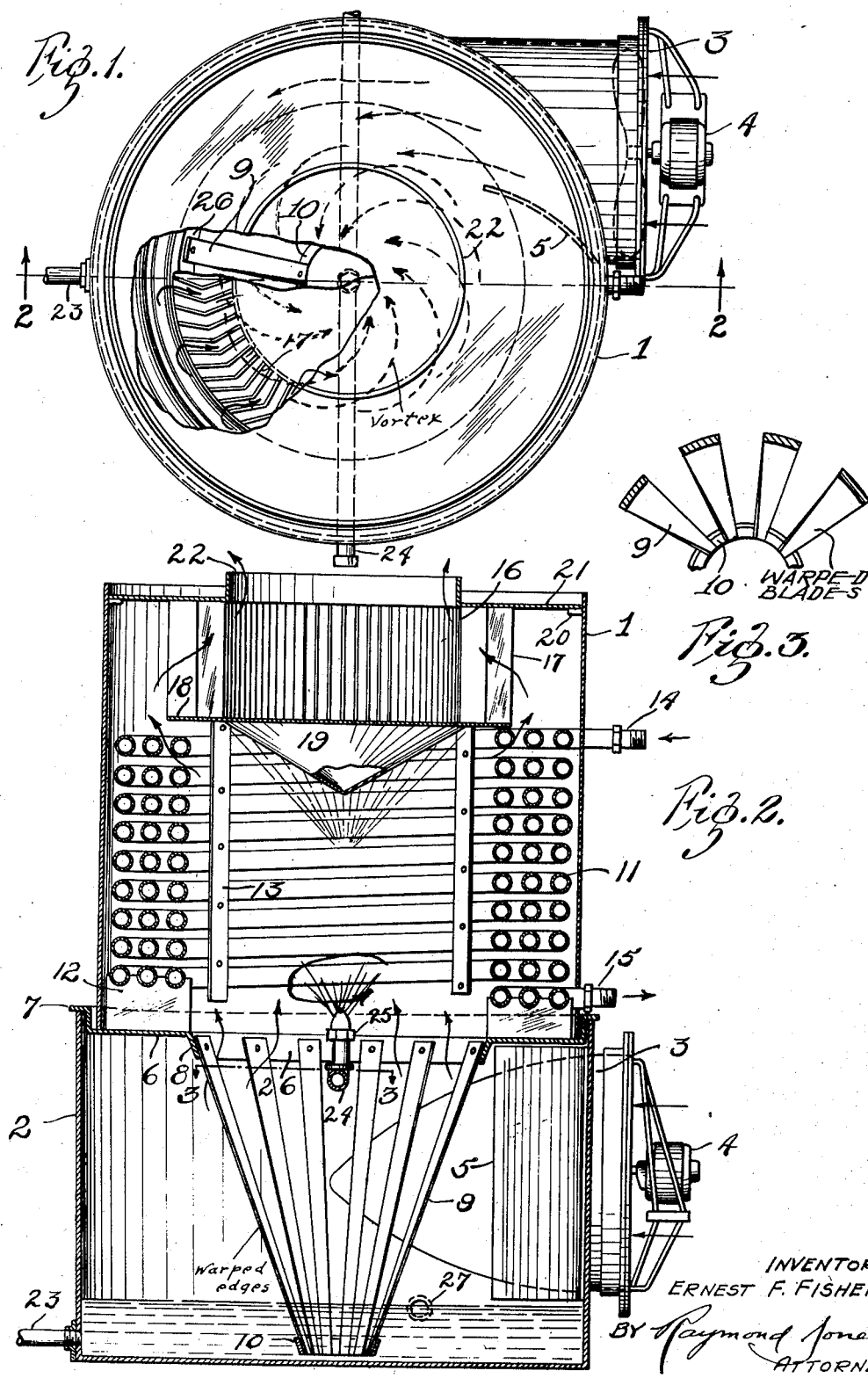

2,142,747

UNITED STATES PATENT OFFICE 2,142,747

EVAPORATIVE CONDENSER

Ernest F. Fisher, Springfield, Ill.

Application June 11, 1937, Serial No. 147,782

7 Claims. (Cl. 257—37)

This invention relates to an evaporative condenser and has, for its main object, to provide a device adapted to condense and cool gases by indirect transfer of heat therefrom through condensing surfaces, which heat is mainly taken up by and used to evaporate a part of a spray of cooling water which is caused to pass over the condensing surface entrained in a stream of cooling air.

Another object is to provide a condenser wherein the condensing surfaces are contacted by a mixture of air and water whereby the water is partly evaporated, the portion not evaporated being returned to be entrained again with the incoming stream of fresh air, cooled thereby, and re-circulated with fresh air to again contact the condensing surfaces in a continuous cycle.

One form of apparatus adapted to provide these and other objects to be described is shown in the accompanying drawing wherein—

Figure 1 is a plan view, partly in section, of a condenser designed according to my invention;

Fig. 2 is a view, in section, on line 2—2 of Fig. 1; and

Fig. 3 is a view in section on line 3—3 of Fig. 2 showing warped blades.

The condenser shown comprises a main heat exchange section 1 and a combined air inlet and water cooling section 2. The fresh air inlet 3 is arranged tangentially to the wall of section 2 and is provided with a blower unit 4. A baffle 5 is positioned to deflect the air stream towards the wall of section 2 and cause a more effective swirl of air in that section. A ring-shaped diaphragm 6 is shown as flanged at 7 and 8. The flange 7 engages the upper edge of section 2. The flange 8 provides a support for a spaced series of narrow elongated vanes 9 that are arranged in a conical formation with warped edges, the lower ends thereof converging inwardly and being connected to a ring 10.

A heat exchanger 11 in the form of a spiral coil is mounted in the main section 1 and is shown as supported on blocks 12 which may be welded to diaphragm 6. A series of clamps 13 serve to retain and brace the coil member. While a coil form of exchanger is shown, various well known equivalents may be used, for example, a finned type exchanger and the sections thereof may be increased to completely fill the cross sectional area of section 1. The gases to be cooled and condensed are admitted at inlet 14 and leave as liquid at outlet 15. A spray eliminator 16 comprising a circular series of radial baffles 17 is located centrally at the upper end of section 1 and terminates at its lower end in a drip plate 18. A spray and air deflector cone 19 is shown supported on the plate 18. A series of lugs 20 welded to the wall of section 1 support a cover plate 21 which, in turn, supports the eliminator 16. The air outlet orifice is shown at 22.

Cooling water is forced by a pump from section 2 by way of a conduit 23 thence to a feed pipe 24 which is connected to a spray head or nozzle 25. This nozzle is located in the axis of and close to the orifice 26 and the high velocity air vortex breaks up the water from the nozzle 25 and the fine spray created thereby is distributed uniformly with the air over the coils by the air swirl. The flange 8 defines a circular orifice 26 positioned centrally of the vortex created in section 2 and the mixture of water and air passes from section 2 through this orifice at high velocity as a swirl into the main section 1. The nozzle 25 is positioned in the axis of the helical current of air and water. The level of water in section 2 is maintained constant preferably by a make-up water inlet 27 controlled in a well known manner by a float operated valve not shown.

In operation, water is sprayed from the nozzle 25 and air enters from inlet 3 and is caused to swirl around and through the vanes 9 which direct the air through orifice 26. This orifice produces a high velocity vortex which entrains and further breaks up the water spray from nozzle 25 causing the mixture of air and water to wipe a maximum surface of the heat exchanger. The air then passes through the eliminator 16 and out at outlet 22. Any entrained water separated by the eliminator drops from the edge of plate 18 onto the upper coil sections. A portion of the entrained water is evaporated by heat from coils 11 while the balance of this water drips from the exchanger surfaces onto the diaphragm 6 and flows through the orifice 26 where it is again subjected to the vortex of air and is cooled. A portion of this cooled water is entrained in the vortex of fresh air and the balance flows to the lower portion of section 2. The hot gases enter inlet 14 and are condensed and flow out at outlet 15 which drains into a receiver.

In the prior art types of evaporative condensers, any unevaporated water tends to increase in temperature unless just enough is supplied to the coils to be completely evaporated and this is difficult to achieve. In my condenser, the water is first reduced to near the wet bulb temperature and then partially evaporated on the condensing surface. The sensible heat and the heat of vaporization are utilized and a greater cooling effect is obtained. The air that is blown over the condensing surface is the air that has cooled the water and this air is mixed with the cooled water. Fresh air is taken in continuously to cool the water. The air that is blown over the candensing surface has taken up some moisture from the water during its cooling. This air may or may not be saturated. Better heat transfer is obtained through the condensing surface with a mixture of cooled water and air at or near the wet bulb temperature and equivalent relative humidity than can be obtained by blowing untreated air and water over this surface at the same temperature.

What I claim is:

1. An evaporative condenser comprising a tank having an inner wall an upper section and a lower section, a heat exchanger positioned within the upper section, means to spray a cooling liquid into said upper section whereby a portion of the liquid will flow into the lower section, an air inlet positioned tangent to the lower section, means to force air into said inlet, said air mixing with said liquid in the lower section whereby to cool said liquid, portions of said liquid being broken up and entrained with the air and being carried thereby upwardly over said heat exchanger.

2. In a device as set forth in claim 1, a vertically extending baffle positioned in the path of air from the inlet and being formed to direct air towards the inner wall of the tank.

3. In a device as set forth in claim 1, a transverse diaphragm below said exchanger and having an orifice, a series of spaced warped blade members positioned opposite to the air inlet and extending downwardly and inwardly to form a conical shape for deflecting cooling air and liquid through the orifice towards the upper section and over said exchanger.

4. An evaporative condenser comprising a tank, a heat exchange element for receiving material to be cooled arranged in the upper portion of said tank, an inlet for forcing cooling air into said tank adjacent the lower end thereof, a transverse diaphragm below said element, said diaphragm being provided with a central orifice, a series of spaced blades positioned in the lower end of the tank opposite said inlet, and adjacent said orifice, a liquid spray above said diaphragm, the air from said inlet being directed to flow between said blades and then upwardly as a vortex to entrain and break up liquid from said spray and force the liquid against the heat exchange element.

5. A condenser comprising a tank, a heat exchange element for receiving material to be cooled arranged in the upper end of said tank, a transverse diaphragm below said element and having an orifice therein, means to spray cooling liquid above said orifice, a series of spaced blades positioned below and adjacent said orifice, an inlet for forcing air into said tank tangentially thereto in line with said blades, said blades being adapted to cause a vortex in the air stream as the air passes through the orifice, said air stream vortex acting to entrain and break up the liquid spray and cause same to impact the heat exchange element.

6. An evaporative condenser comprising a tank, a heat exchange element for receiving material to be cooled arranged in the upper portion of said tank, an inlet for forcing cooling air into said tank adjacent the lower end thereof, a transverse diaphragm below said element, said diaphragm being provided with a central orifice, means positioned above said orifice for spraying cooling liquid, said inlet being arranged tangent to the tank, the air from said inlet being directed to flow upwardly through said orifice as a vortex to entrain and break up liquid from said spray and force same against the heat exchange element.

7. An evaporative condenser comprising a tank, a heat exchange element in the form of a spiral coil for receiving material to be cooled and arranged in the upper portion of said tank, an inlet for forcing cooling air into said tank adjacent the lower end thereof, a transverse diaphragm below said element, said diaphragm being provided with a central orifice, means positioned above said orifice for spraying cooling liquid, said element being supported on said diaphragm concentrically with said orifice, said inlet being arranged tangent to the tank, the air from said inlet being directed to flow upwardly through said orifice as a vortex to entrain and break up liquid from said spray and force same against the heat exchange element.

ERNEST F. FISHER.